(No Model.)

G. FARR.
GAS BURNING FURNACE.

No. 303,963. Patented Aug. 19, 1884.

Attest
W. H. Binns
O. M. Hill

Inventor
George Farr
per Wm. Hubbell Fisher, Atty.

UNITED STATES PATENT OFFICE.

GEORGE FARR, OF CINCINNATI, OHIO, ASSIGNOR TO THE STANDARD COMBUSTION COMPANY, OF SAME PLACE.

GAS-BURNING FURNACE.

SPECIFICATION forming part of Letters Patent No. 303,963, dated August 19, 1884.

Application filed April 4, 1884. (No model.)

*To all whom it may concern:*

Be it known that I, GEORGE FARR, a resident of the city of Cincinnati, in the county of Hamilton and State of Ohio, have invented certain new and useful Improvements in Gas-Burning Furnaces, of which the following is a specification.

The primary object of my invention is to thoroughly consume all combustible matter, solid or fluid, of the fuel fed into the furnace, including that which is present at the time of feeding the fuel to the fire, and that which is subsequently evolved during the process of combustion.

The various features of my invention, and the several advantages resulting from their use, conjointly or otherwise, will be apparent from the following description.

A principal feature of my invention consists in a novel and useful method of effecting combustion. This method consists, essentially, in forcibly introducing hydrogen gas into the fire-chamber, and also fresh air in conjunction with said hydrogen gas.

Another principal feature of my invention consists in employing said hydrogen gas for forcibly introducing air along with it (said hydrogen gas) into the furnace.

The main advantages resulting from my invention are, first, that I break up and finely divide the fuel-gases generated or evolved from the fuel in the furnace during combustion; and, secondly, the air and hydrogen gas are intermixed with these finely-divided portions of the fuel-gas, and the air and hydrogen gas are thereby brought into intimate and direct contact with the finely-divided portions or atoms of the fuel-gases, and a complete combustion of the fuel-gases in the furnace is thereby secured.

Another principal advantage of my invention is that it causes the fuel-gases in the furnace to be consumed when the ordinary heat of the furnace has been reduced, as is usually the case during the operation of stoking, or when green or fresh fuel has been fed to the furnace.

Figure 1:
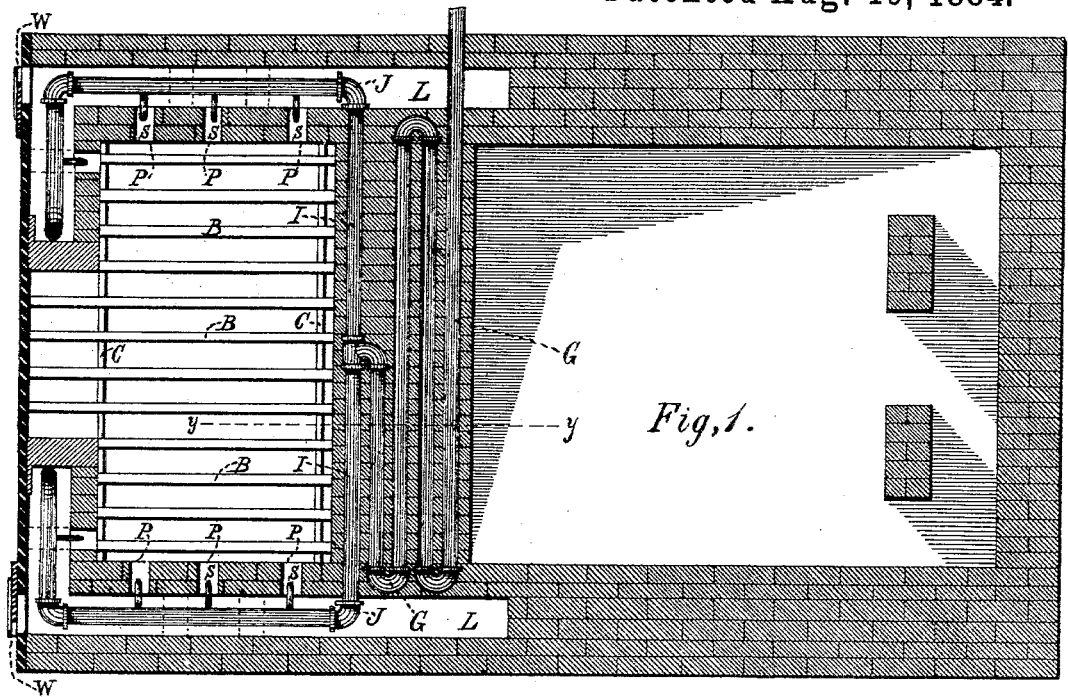
Figure 2:
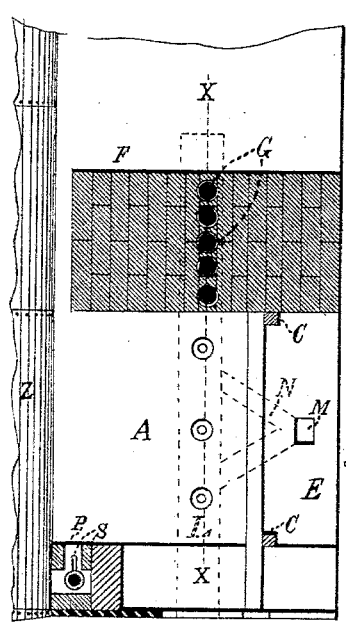
Figure 3:
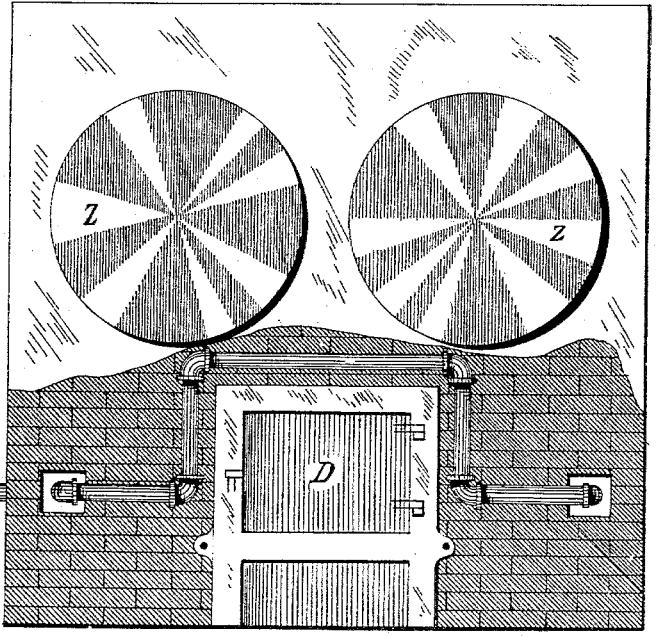

Various means may be employed to enable these aforementioned features of my invention to be successfully carried on; and I do not confine myself to any one set of means for this purpose. A preferred description of means for enabling the said process to be operated, and which means are also of my invention, and are features of my invention, are as follows:

In the accompanying drawings, Figure 1 represents a horizontal section of a furnace, illustrating my preferred kind of means, taken in a plane through the dotted lines $x\,x$, Fig. 2, and looking from above downward. Fig. 2 represents a vertical longitudinal section of the same furnace, taken at the dotted line $y\,y$ of Fig. 1, and looking toward that side of the furnace which is the upper side of Fig. 1; and Fig. 3 represents a front elevation of said furnace, the lower portion being broken away to show the preferred arrangement of hydrogen, gas pipes at the front of the furnace.

A indicates the fire-chamber, of any preferred shape and size.

B indicates the grate or grate-bars, of any desired form and suitably supported. One of the most common means of supporting them is shown, and consists of the cross-bars C C, on which the grate-bars rest, the ends of the cross-bars being supported by the side walls of the furnace. The furnace has a suitable feeding door or doors. Thus a common form of door, D, is shown.

E indicates an ash-pit of any suitable configuration.

F indicates the bridge-wall of any suitable form.

The furnace may be employed for various heating purposes. Where used to heat a boiler or boilers, the boiler may be present, as is commonly the case, in the roof of the fire-chamber, as shown, the boiler or boilers being indicated by Z.

A convenient cheap means for generating or producing hydrogen gas is as follows: A pipe, or two or more connected pipes, G, are embedded in the bridge-wall of the furnace. One end of this pipe or coil of pipes is connected to a pipe, H, from the steam-space of the boiler in such a manner that communication is established between them. The heat of the fire in the furnace will heat the pipes G to a red heat, or to a very high degree of heat. The steam from the boiler enters these pipes, and on coming in contact with the red-hot metal of the pipes gives up its oxygen, which latter gas is absorbed or taken up by the metal and the hydrogen gas is left. This gas passes on through the pipes, and is ejected with force into the furnace, and at the same time its blast is utilized to carry heated air into the furnace.

A preferred means for carrying into effect these last-named operations is as follows: The hydrogen-generating pipe, or coil of pipes, H, is connected to pipes I I. One of these pipes I extends to and communicates with a pipe, J, located at and in one side of the furnace, and the other of these pipes I extends to and communicates with a pipe, J, located at and in the other or opposite side of the furnace. In each side of the furnace, in the wall, there is present an air space or flue, L. This air-space is seen in Fig. 1, and is also shown in Fig. 2 in dotted lines running parallel to the bottom of the boiler Z. This air space or flue receives its air from an inlet, M, or inlets extending through the side of the wall into the ash-pit. This inlet M communicates with the air space or flue L by means of upwardly-extending flue or flues N in the wall. Such flues N are shown by dotted oblique lines in Fig. 3, and these two flues N take air from the inlet M, and, diverging as they extend upward, supply air to different portions of flue L.

The arrangement of inlet flue or flues M and of flues connecting the same with flue L is preferably the same on both sides of the furnace. In each of the flues is one of the pipes J. Each flue L has passages or exit-flues P, each of which latter extends from its flue L inwardly through the wall to the furnace. The pipe J in the flue L is provided with discharge-nozzles S. There are preferably as many nozzles as there are exit orifices or flues P. Each discharge-nozzle S enters centrally into the inner end of an adjacent exit-flue P, but preferably does not extend all the way through the said exit-flue P. These exit-flues P and discharge-nozzles S are preferably located above the upper surface of the fuel in the fire-chamber.

The mode in which this combination of pipes, nozzles, and flues operates is substantially as follows: The steam from the boiler under boiler-pressure enters pipes G, and while passing through said pipes the oxygen gas of the steam is taken up and the hydrogen gas is liberated. This hydrogen gas is forced forward by the pressure of the steam behind and passes rapidly through the pipes I, and issues in a jet from each of the discharge-nozzles S. These jets issue with great force, and their preferred direction is across the furnace, and so as not to impinge against the boiler above or the fuel below. As the jet passes through its adjacent exit air-flue P, it creates a vacuum behind it, thereby causing a suction, and thereby draws up and greatly accelerates the upward draft or movement of the air from the ash-pit, through inlet M and flues N and flue L, into its exit-flue P, and it (the jet) then carries the air along with it with force into the furnace. As this air in reaching exit-flue P is compelled to pass through the heated walls of the furnace, it becomes heated; hence when it issues into the furnace it is thoroughly heated.

The arrangement of flues and nozzles may be present in other portions of the furnace, as well as at the sides.

A preferred mode of continuing at the front of the furnace this combination of pipes, nozzles, and flues is shown and is as follows: The flues L are respectively continued around in that part of the front wall which is respectively adjacent to them, and extend as far as the furnace or fire door D. The pipes J are likewise continued in these flues, and upon reaching the fire-door D extend up along and near to the side of the said door, and also along over the door, and are there connected together, so as to intercommunicate. The flues L L, having been continued from their respective side walls around the front of the furnace to their adjacent edges of the fire-door, are then continued up along the side of the door, and then over the top of the latter, and there join and communicate. The pipes J at all these points are preferably within the flues L.

Over the fire-door the flues L are provided with exit-flues P, and the pipes J with discharge-nozzles S, each flue P having a discharge located therein in substantially the same manner as the discharge-nozzles in the side walls are respectively located in their respective exit-flues P. Thus jets of hydrogen and hot air are discharged from over the door into the furnace, and the direction of these jets is such as that they shall not impinge against the boiler, and they are preferably directed so as to impinge against the rear end of the grate-bars, or where the latter join the front side of the bridge-wall.

The advantages of this mode or process of facilitating and aiding combustion are as follows:

First. The hydrogen gas carries the air into the furnace above the solid fuel and supplies the necessary amount of oxygen to the fuel gases above the solid fuel, to enable them (said gases) to be consumed before leaving the fire-chamber. The necessity for this extra supply of oxygen to the furnace above the fuel arises from the fact that the oxygen supplied in the air fed to the fuel through grate-bars from the ash-pit has been taken up and used while passing through the solid portions of the fuel, and hence cannot assist in consuming the volatile fuel which comes from the combustion of the solid fuel, and is present unconsumed in the furnace above the solid fuel.

Secondly. The hydrogen gas and air are forcibly projected into the furnace above the solid fuel. This forcible impingement of the said hydrogen gas and air upon the unconsumed fuel gases thoroughly distributes and commingles the air, hydrogen gas, and the fuel gases, so that the fuel gases are broken up and divided into minute portions, and between these minute portions the air is injected and mixed therewith. Thus the fresh oxygen in this air is brought into thorough contact with the particles or minute portions of the fuel gases, and the latter are furnished with the element whereby they may be readily consumed, and combustion of these fuel gases immediately takes place and they are entirely consumed. The hydrogen gas at all times promotes combustion of the fuel gases in the furnace above the fuel, when the said hydrogen gas is introduced along with the oxygen of the heated fresh air. The hydrogen gas is also a valuable agent in promoting combustion in the furnace, as follows, viz: In an ordinary furnace whenever a fresh charge of fuel is introduced into the furnace the temperature in the furnace is lowered to a temperature below 800°. As the hydrocarbons require a temperature of about 800° before they will burn, it is obvious that until the temperature in the furnace is again raised to 800°, or thereabout, the said hydrocarbons will pass and continue passing from the furnace unconsumed, and thus much heat will be wasted and the uniform production of heat be prevented, and in the case of steam-boilers less steam will be generated and the working power of the boiler be diminished. In my present mode of facilitating combustion free hydrogen gas is present. This hydrogen gas unites with oxygen at any temperature and inflames at 300°. Thus, when the temperature in the furnace is lowered from adding a fresh charge of fuel, or from other causes, the hydrogen gas will nevertheless inflame, and its heat thus generated will at once cause the hydrocarbons to combine with the oxygen of the air introduced with the hydrogen gas, and thus cause combustion of the fuel gases to be carried on in the presence of fresh fuel, &c., which would otherwise in part defeat the combustion of the fuel gases above the solid fuel. The hot-air flue L is preferably provided with a suitable register, W, located as desired, but preferably situated in the front end of the flue. When a greater quantity of air than can be supplied through the ash-pit inlet-flues M is (for any reason) needed, the register W is opened sufficiently to supply the needed extra amount of air. The upper end of each flue N is preferably placed directly under a discharge-nozzle, S, and such arrangement contributes toward preventing the flue L from filling with any dust or dirt which may be brought up through flue N. The pipe or pipes G are preferably located as shown in the bridge-wall, but they may (when confined to the furnace) be placed in any part of the furnace or smoke-flue where they will receive heat enough to liberate hydrogen gas from the steam. It is not necessary that the pipe J should be in the hot-air flue L, as the pipe J might be located differently, the nozzle being in the exit-flue P and constructed to communicate with pipe J. When desired, the fresh air may be forced or projected into the fire-chamber by a blower or means other than the suction caused by a vacuum created by the rapidly-moving hydrogen gas. In other words, the fresh air may be projected into the furnace by means independent of those employed to project the hydrogen gas into the furnace, and the nozzle might be separated from the exit-flue P; but the employment of the forcibly-projected hydrogen gas to forcibly introduce the fresh air into the fire-chamber is preferred, as in this way expense is saved and air and hydrogen gas are readily kept in close contact.

While the various features of my invention are preferably employed together, one or more of said features may be employed without the remainder, and one or more of said features may, so far as applicable, be employed in connection with furnaces other than that particularly herein specified.

What I claim as new, and desire to secure by Letters Patent, is—

1. The combination of hydrogen-gas-generating pipes G in the bridge-wall, pipes I and J, arranged as set forth, nozzles S, and flues M, N, L, and P, the nozzles being respectively located in their respective exit-flues, substantially as and for the purposes set forth.

2. The combination of hydrogen-gas-generating pipes G in the bridge-wall, pipes I and J, nozzles S, flues M, N, L, and P, the nozzles being respectively located in their respective exit-flues, and register W, substantially as and for the purposes specified.

3. The horizontal flue L, and air-flues arranged below the jets s, and converging and extending downward to the air-inlets, substantially as described.

GEORGE FARR.

Witnesses:
 JNO. W. STREHLI,
 O. M. HILL.